(12) United States Patent
Shin et al.

(10) Patent No.: US 8,726,063 B2
(45) Date of Patent: May 13, 2014

(54) SYSTEMS AND METHODS PROVIDING OUTPUT SAMPLE FREQUENCY DETERMINISM BY CALCULATING A DELAY WITH A WALL CLOCK AND USING A TIMER TO COMPENSATE FOR THE DELAY

(75) Inventors: David W. Shin, Fort Wayne, IN (US); Richard J. Kenefic, Fort Wayne, IN (US); Saad Karim, Cary, NC (US)

(73) Assignee: Raytheon Company, Waltham, MA (US)

( * ) Notice: Subject to any disclaimer, the term of this patent is extended or adjusted under 35 U.S.C. 154(b) by 300 days.

(21) Appl. No.: 13/191,110

(22) Filed: Jul. 26, 2011

(65) Prior Publication Data

US 2013/0031401 A1 Jan. 31, 2013

(51) Int. Cl.
G06F 1/12 (2006.01)
G06F 1/00 (2006.01)

(52) U.S. Cl.
USPC .......................................... 713/401; 713/500

(58) Field of Classification Search
USPC ....................................................... 713/401
See application file for complete search history.

(56) References Cited

U.S. PATENT DOCUMENTS

| 6,829,229 B1* | 12/2004 | Palermo et al. ................ 370/347 |
| 2004/0260890 A1* | 12/2004 | Hoogerbrugge et al. ...... 711/150 |
| 2006/0245454 A1* | 11/2006 | Balasubramanian et al. 370/509 |
| 2006/0276912 A1* | 12/2006 | Pearce et al. ..................... 700/20 |
| 2007/0260907 A1* | 11/2007 | Dixon et al. ................... 713/500 |

OTHER PUBLICATIONS

Kenefic, et al. Method and Apparatus for Configurable Sample Rate Conversion in Teleoperated Devices.*
Kenefic, et al. Method and Apparatus for Configurable Sample Rate Conversion in Teleoperated Devices, submitted by Applicant on Jul. 26, 2011.*
Richard J. Kenefic, David W. Shin Saad Karim, U.S. Appl. No. 12/943,228, filed Nov. 10, 2010, for "Method and Apparatus for Configurable Sample Rate Conversion in Teleoperated Devices," 23 pages of text, 12 pages of drawings.
"@CHIP-RTOS-RTOS API", IPC@CHIP® Documentation Index, printed from http://www.beck-ipc.com/files/api/scxxx/rtxapi.htm#0xAD0x32 on Jul. 26, 2011, 55 pages.
VXWorks html documentation on RTOS timers, Radbound University Nijmegen Computing Science Department, printed from http://www.cs.ru.nl/lab/vxworks/vxworksOS.html#toc.16 on Jul. 26, 2011, 11 pages.
google.com, from Code Google "Duinos FreeRTOS based real time operating system for Arduino compatible boards", printed from http://code.google.com/p/duinos/source/browse/trunk/arduino.DuinOS/wiring.c?spec=svn30&r=30# on Jul. 26, 2011, 4 pages.

* cited by examiner

*Primary Examiner* — Thomas Lee
*Assistant Examiner* — Robert Cassity
(74) *Attorney, Agent, or Firm* — Daly, Crowley, Mofford & Durkee, LLP

(57) ABSTRACT

A computer-implemented method for performing processing including setting a timer associated with a first processing event, scheduling an expected time for the processing event using wall clock time, at the timer, using the expected time to calculate a delay associated with the timer, performing the first processing event in response to the timer, and setting a subsequent timer to compensate for the delay.

20 Claims, 3 Drawing Sheets

SYSTEMS AND METHODS PROVIDING OUTPUT SAMPLE FREQUENCY DETERMINISM BY CALCULATING A DELAY WITH A WALL CLOCK AND USING A TIMER TO COMPENSATE FOR THE DELAY

GOVERNMENT LICENSE RIGHTS

This invention was made with government support under contract number W56HZV-05-C-0724 awarded by The United States Department of Defense. The government has certain rights in the invention.

FIELD OF THE INVENTION

This disclosure relates in general to processing samples in a system and, more specifically, to increasing the precision of an output frequency for the samples.

BACKGROUND

Some military applications currently use unmanned vehicles, both ground vehicles and airborne vehicles, for various missions. In remote teleoperation of unmanned ground vehicles (UGVs) an operator may use a joystick to point sensors and steer the vehicle. For instance, a software process running on the UGV may receive Radio Frequency (RF) signals over the air containing joystick position samples. These samples are passed to other processes running on the UGV.

Further, the operating system on which the software implementation is hosted may not be a real time operating system (RTOS). In such case, the operating system preemption may cause a non-deterministic delay in the production of output samples (where the delay can be positive or negative). In addition, if the input samples are received over a radio link, the competition for access to the radio channel by other services can delay the input samples, resulting in an uneven or bursty receipt of input samples.

Thus, in one example, a non-RTOS runs an application that provides output samples at a frequency $F_{out}$. The software program is set to send an output sample at time 1 and then to wait $1/F_{out}$ to send the next sample. After sending the next sample, it waits another $1/F_{out}$, and so on. However, because the operating system is a non-RTOS, there may be a non-deterministic delay for a given sample. Also, because the system attempts to send a next sample by waiting another $F_{out}$ relative to a previous sample, delays tend to be cumulative over multiple samples. Such behavior may appear as uneven or bursty responses by the UGV.

SUMMARY

According to one embodiment, a computer-implemented method for performing processing including setting a timer associated with a first processing event, scheduling an expected time for the processing event using wall clock time, at the timer, using the expected time to calculate a delay associated with the timer, performing the first processing event in response to the timer, and setting a subsequent timer to compensate for the delay.

According to another embodiment, a computer readable medium tangibly recording computer program logic for performing a series of processing events at a frequency, $F_{out}$, the computer program product including code to generate wall clock time data, code to provide software timers associated with individual ones of the processing events; code to set individual ones of the software timers to eliminate a delay calculated using the wall clock time data.

According to yet another embodiment, a processor-based device includes a memory device that includes a plurality of output samples of control information, a sample output unit that retrieves the samples from the memory device at intervals of $1/F_{out}$, where $F_{out}$ is an output frequency, the sample output unit sending ones of the output samples at timers associated with the intervals, the sample output unit further setting the timers to compensate for a delay calculated using wall clock time, and a device control unit receiving the samples and using the samples to control a physical operation of the processor-based device.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
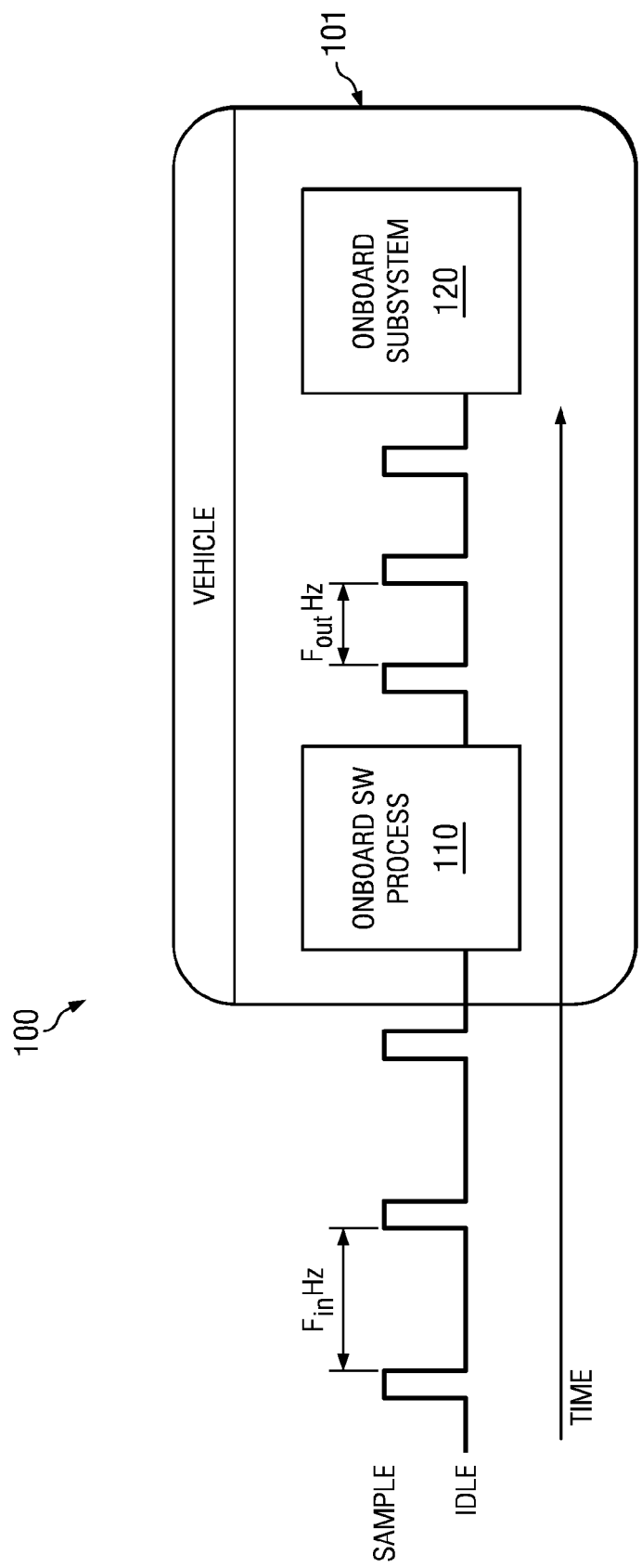
FIG. 1 is an illustration of an exemplary system for receiving and processing control signals as samples.

Various embodiments provide techniques to increase determinism in an output sample frequency. While the following examples mention military applications, it is noted that various embodiments are not limited to military uses. Instead, various embodiments may find use in commercial, industrial, and consumer applications, especially where input signals are sampled and/or wherein Sample Rate Conversion (SRC) is performed.

In one example embodiment, a data receiving unit receives data at a software sampling process running on a non-RTOS. The software sampling process has an input thread that receives samples and then places the samples in a shared buffer. An output thread then accesses the samples from the buffer and sends the samples to another subsystem.

The output thread operates in a manner that increases precision in the frequency at which it outputs samples. In this example, the output thread uses wall clock time to set a base time. The base time is used at subsequent samples to judge a delay and to compensate for the delay.

Continuing with the example, the output thread retrieves a sample from the buffer and then waits for a first timer signal. It uses wall clock time to calculate expected interval times from a base time T0. If each sample is supposed to be sent at $1/F_{out}$ intervals, and if the first sample is sent at T0, the subsequent samples are expected to be sent at $T0+N*(1/F_{out})$, where N is an integer greater than zero. The system sends the sample and sets the timer for the next interval.

At the next timer, the system compares the timer time to an expected time. The comparison reveals a delay in the timer. The system then sends a sample and sets the timer for the next interval by either adding time or subtracting time from $1/F_{out}$ in order to compensate for the delay that was experienced. The next interval may or may not experience its own delay, but the delay compensation at the present interval prevents the delays from accumulating.

The system then repeats the delay calculation and timer compensation at each subsequent interval. It should be noted that delays, as used in this example, may be positive or negative, and the system may compensate by adding or subtracting time from $1/F_{out}$ as appropriate.

Various embodiments further include one or more processor-based devices to implement the process discussed above. For instance, some embodiments include a processor that executes computer code to perform the functions that make up the sample handling technique. Other embodiments may be implemented in hardware or a combination of hardware and software.

Some implementations may be applicable to teleoperated devices, though the scope of embodiments is not so limited. Various embodiments include systems, methods, and computer program products that provide output samples for any type of application.

The above-identified example embodiments are for illustration purposes only, and the scope of embodiments is not limited to the details described above. The following figures are used to describe example embodiments in more detail.

FIG. 1 is an illustration of exemplary system 100, adapted according to one embodiment. The various components of system 100 may be implemented as hardware and/or software modules that execute computer-readable code (e.g., software or firmware) providing functionality described herein. The example of system 100 is in the context of a teleoperated vehicle. However, it is noted that the scope of embodiments is not limited to teleoperated vehicles. For instance, the functionality described herein may be implemented in a control base station for a teleoperated vehicle where the teleoperated vehicle and the control base station communicate bi-directionally. Various embodiments may be adapted for use in any application that experiences a cumulative delay.

Vehicle 101 receives a control signal and samples the control signal at a frequency $F_{in}$. Specifically, on-board software process 110 is in communication with a transceiver (not shown) to receive the samples at $F_{in}$. On-board software process 110 performs a SRC process so that the samples are output at a frequency $F_{out}$, which may be the same or different than $F_{in}$. On-board software process 110 in this example is a computer program executed by a processor or processors (not shown), and the same is true for on-board subsystem 120. On-board software process 110 is described in more detail with respect to FIG. 2.

On-board software process 110 includes functionality for increasing determinism of $F_{out}$. In this example, vehicle 101 runs a non-RTOS, which experiences non-deterministic delays. Specifically, each output sample sent from process 110 to subsystem 120 is likely to have a delay resulting from different processes with different priorities competing for processor time. For each sample, the delay is not known ahead of time. As explained in more detail below, on-board software process 110 includes functionality to measure a delay using wall clock time and to schedule a next sample to compensate for the delay.

On-board subsystem 120 receives the samples from process 110 and uses the samples to control the physical operation of the vehicle 101. For example, in a ground-based vehicle scenario, the on-board subsystem 120 may control the speed and direction of the vehicle, among other things. In an aerial vehicle example, the on-board subsystem 120 may control the speed and altitude of the vehicle, among other things.

Figure 2:
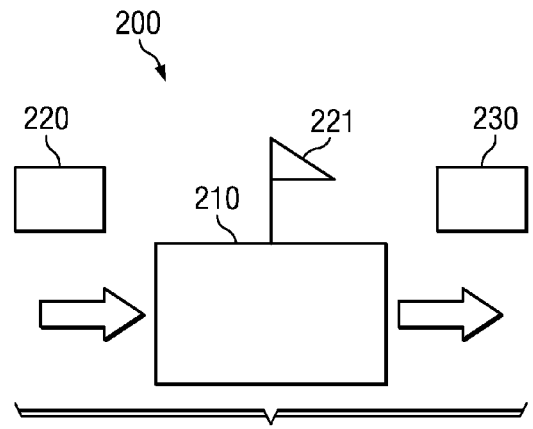
FIG. 2 is an illustration of processes to implement a sampling operation to increase precision of an output frequency according to one embodiment.

FIG. 2 is an illustration of processes 200, which operate in on-board subsystem 110 (FIG. 1) according to one embodiment. Input thread 220 queues samples in shared buffer 210 at the input frequency $F_{in}$. Output thread 230 de-queues samples from shared buffer 210 at the output frequency $F_{out}$.

Input thread 220 and output thread 230 are independent processes running on the operating system of vehicle 101 (FIG. 1). Such an arrangement may provide one or more advantages. For instance, the independence of threads 220, 230 allows threads 220, 230 to have different sampling rates. In another aspect, threads 220, 230 operate independently and in parallel, and burstiness in the operation of one of the threads 220, 230 may not affect the timing of the other thread.

Shared buffer 210 is a memory structure implemented as a First-In-First-Out data buffer that receives samples from thread 220 and provides output samples to thread 230. Shared buffer 210 is a resource that is accessed by multiple processes (in this instance, by threads 220, 230). Accordingly, shared buffer 210 includes semaphore 221 to resolve concurrency issues. Semaphore 221 may be implemented as a binary semaphore (indicating buffer 210 as available or unavailable) or as a counting semaphore that provides an indication of a number of samples available to be accessed. The scope of embodiments is not limited to any particular configuration for semaphore 221.

Figure 3:
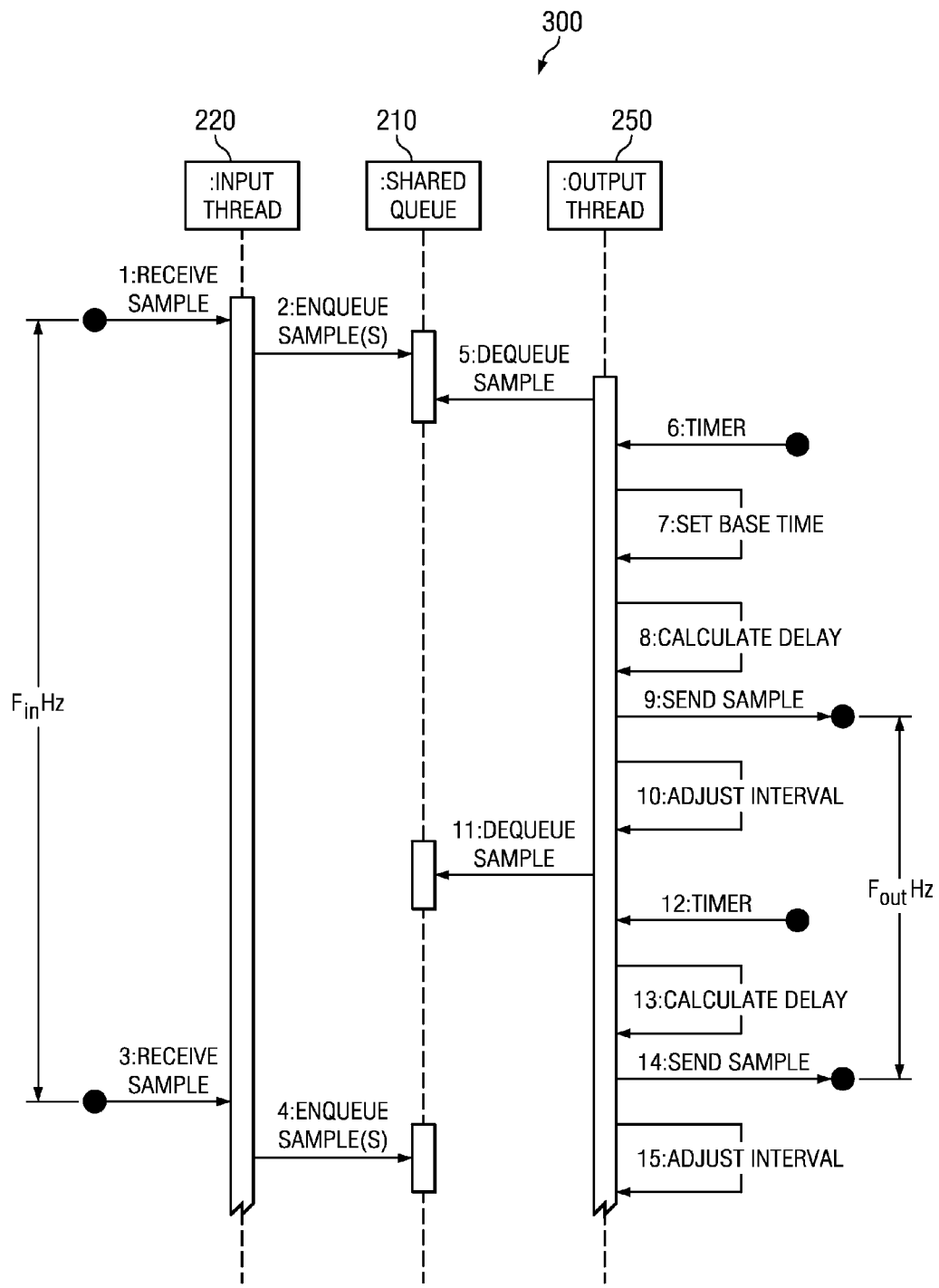
FIG. 3 is an illustration of an exemplary method for handling samples using the processes of FIG. 2.

FIG. 3 is an illustration of method 300, adapted according to one embodiment. FIG. 3 illustrates the behavior for the special case of a 2:1 SRC. In the case of a 2:1 SRC, each enqueueing step may enqueue more than one sample due to unsampling and/or receiving more than one input sample at a given time.

It is noted that the $F_{in}$ and $F_{out}$ frequencies may differ based on whether any sample rate conversion has been used. The scope of embodiments is not limited to any particular relationship between $F_{in}$ and $F_{out}$, as 2:1 SRC is merely one example. Some embodiments may omit SRC altogether.

At actions 1-4, thread 220 receives and enqueues samples. The samples are enqueued in shared buffer 210, as explained above. Actions 5-10 illustrate one iteration of output thread 230 accessing and sending a sample, as well as compensating for a calculated delay. Actions 11-15 show a next delay calculated, timer set, and sample sent. Actions 5-15 are also explained with respect to the pseudocode examples provided below.

In actions 6-10, a first sample is sent in response to a timer. At action 7, a base time is set using a non-relative time (in this instance, wall clock time), and the base time serves as a basis for calculating a schedule of expected interval times for sending subsequent samples. Wall clock time may be accessed from the operating system kernel or other resource, as appropriate. A delay associated with the timer is calculated (action 8) with respect to the expected times in the schedule. The next timer is then set (action 10) to compensate for the calculated delay.

Actions 11-15 illustrate the next sample being sent by thread 230. At action 12, the next timer occurs, adjusted according to action 10. A delay of the timer is calculated (action 13), and the following subsequent timer is scheduled (action 15) to compensate for the delay calculated at action 13. Further samples are then received and sent, as actions 1-15 are repeated as many times as desired. However, it should be noted that action 7 may be omitted in subsequent iterations, since $1/F_{out}$ may be added to the base time at each iteration, rather than resetting the base time.

The following example provides a pseudocode implementation according to one embodiment for implementing the method 300. The pseudocode example focuses on actions of the output thread 230 as it compensates for non-deterministic delays in the operating system.

```
1       interval = 1/Fout

2       SET_TIMER (interval)
3       sample        = DEQUEUE ()
4       TIMER_WAIT ()
5       exp_tm        = current time
6
7       DO
8           cur_tm        = current time
9           diff_tm       = cur_tm − exp_tm
10
11          SEND_OUTPUT (sample)
12
13          interval      = INTV_ADJUST (interval, cur_tm, exp_tm, diff_tm)

14          exp_tm = exp_tm + 1/Fout

15          SET_TIMER (interval)
16          sample        = DEQUEUE ()
17          TIMER_WAIT ()
18      WHILE ( !finished )
```

As this example begins, the input thread takes the input samples and stores them into a shared buffer. At lines 1-5, the interval is defined as $1/F_{out}$, which is the reciprocal of the output frequency $F_{out}$. The timer is set to wake up in a time unit equal to the interval. In further steps a sample is sent in response to the timer waking up. The pseudocode implementation adjusts the interval according to a calculated delay and sets the timers to the adjusted interval to compensate for the delay.

At lines 1-5 the base interval (interval) is set and waits for both an output sample and a timer signal. When triggered by the timer, the output process sets the base expected time (exp_tm) to the current wall clock time.

At lines 7-11, the system calculates a delay (diff_tm) by comparing the expected time (exp_tm) to the current time (cur_tm) and sends the output sample. At the first interval, both cur_tm and exp_tm are equal to the current wall clock time, and diff_tm is equal to zero. In subsequent iterations, $1/F_{out}$ is added to exp_tm, whereas cur_tm continues to be set to a current wall clock time; therefore, non-zero delays may be expected in subsequent iterations.

At lines 13-17, the system adjusts the next interval timer (interval) to compensate for any delay and sets the next expected time (exp_tm) by adding $1/F_{out}$. Note that the INTV_ADJUST function is dependent on the behavior of the underlying operating system. It involves the developer understanding the behavior of the operating system (e.g., expected delay behavior caused by competing processes) and implementing the adjustment of the timer appropriately. A sample of INTV_ADJUST( ) is provided below for illustration purposes, though the scope of embodiments may include any appropriate INTV_ADJUST( ) function. Once the next timer interval has been adjusted, it prepares for the next cycle. The actions of lines 8-17 are repeated for each subsequent output sample.

The following pseudocode provides an illustration of one particular INTV_ADJUST( ) function.

```
        INTV_ADJUST (interval, cur_tm, exp_tm, diff_tm)
19          new_interval = interval
20          IF cur_tm > exp_tm
21              IF diff_tm > interval
22                  new_interval = 0
23              ELSE
24                  new_interval = 1/Fout − diff_tm 25          ELSEIF cur_tm < exp_tm
26                  new_interval = 1/Fout + diff_tm 27
28          RETURN new_interval
```

At lines 19-24, the system checks whether the current time (cur_tm) has passed the expected interval time (exp_tm). If true, it checks whether the interval has been missed (Line 21), which in this example sets the new interval to 0 in order to "catch up" (Line 22). Else, if the current time is still within the interval limit, the delay (diff_tm) is subtracted from the interval rate (Line 24).

Lines 25-28 illustrate the case in which the current time (cur_tm) is earlier than the expected interval time (exp_tm). The new interval is then set to include the difference time (diff_tm) to the new interval time (Line 26).

The process described above can be implemented in any of a variety of operating systems that have delays, whether deterministic or otherwise. Examples of such operating systems include, without limitation, Unix, Linux (and other Unix variants), Windows™, and the like.

For example, when implemented in Linux, different approaches can be used. In one example Linux embodiment, the output thread may use system signals (e.g., hardware interrupts) for the timers. In another example Linux embodiment, the output thread uses a software-level sleep-based application for the timer.

Furthermore, it should be noted that the scope of embodiments is not limited to the exact implementations shown above. Rather, other embodiments may add, omit, rearrange, or modify actions compared to the embodiments shown in FIGS. 1-3. For instance, some embodiments may send a sample immediately after a timer occurs rather than calculating a delay after the timer occurrence and before sending the sample.

Also, many embodiments may include process steps that occur before the samples are enqueued or after the samples are sent. For instance, some embodiments include a transceiver unit (not shown) that receives communication signals over the air or other medium, samples the signals, and provides the samples to the input thread. The embodiment may further include a vehicle control unit that uses the received output samples to control the physical operation of the vehicle.

Furthermore, the scope of embodiments is not limited to systems that process samples. In fact, various embodiments may be applied anywhere interval based operations are performed, whether or not the operations process samples. For example, if certain logic is processed every N seconds, the output thread portion may be used to "wake up" and process at a more precise interval, even without the input thread and buffer.

Figure 4:
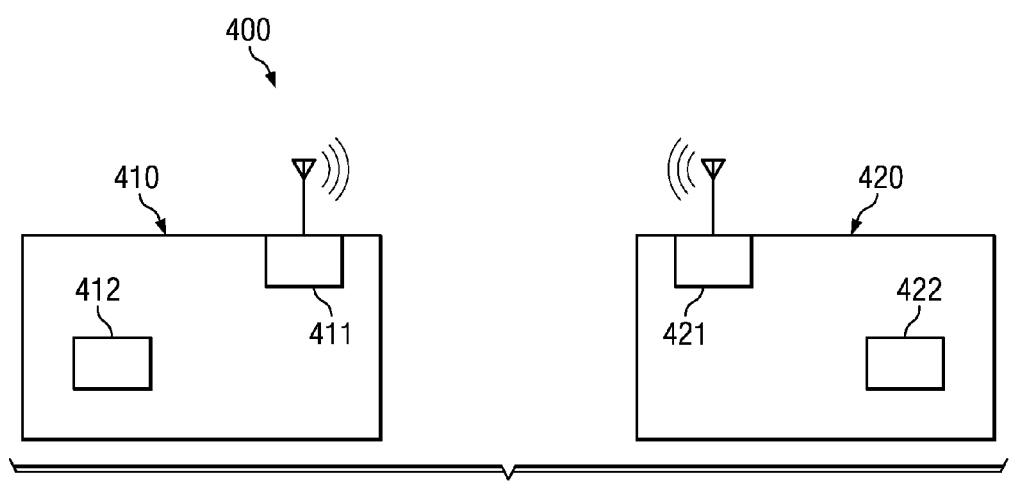
FIG. 4 illustrates an exemplary system that may be adapted to use a delay-minimizing method for output sample provision according to one embodiment.

FIG. 4 is an illustration of exemplary system 400 adapted according to one embodiment. System 400 includes base station 410 and controlled vehicle 420. Base station 410 includes transceiver unit 411, which sends and receives information to and from controlled vehicle 420. Base station 410 also includes user interface unit 412, which may include a hardware device such as a mouse or joystick to receive input control from a human user. The scope of embodiments is not limited to any particular user interface device or base station configuration.

Controlled vehicle 420 includes transceiver unit 421, which sends and receives information to and from base station 410. For instance, transceiver unit 421 may receive control data from base station 410 and make samples of the data that are sent to input thread 220 (FIG. 2). Input thread 220, output thread 230, and buffer 210 may be implemented in vehicle control module 422, which handles the samples and generates internal control signals for physical components of vehicle 420.

A similar process of sample enqueuing, buffering, de-queuing, and delay compensating may be performed at the base station 410 if desired, in situations wherein communication with the vehicle 420 is bi-directional.

It is understood that some embodiments are implemented in computer executable code (e.g., software, firmware), that is run by a processor device. One embodiment includes running code on specially built hardware (e.g., a processor board with a Field Programmable Gate Array (FPGA) and memory), whereas another embodiment may be run on a general-purpose computer that has appropriate interfaces to receive (or send) control information.

When implemented via computer-executable instructions, various elements of some embodiments are in essence the software or firmware code defining the operations of such various elements. The executable instructions or code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

The processing unit may include, for example, a general purpose CPU, which may execute the various logical instructions according to embodiments of the present disclosure. For example, one or more CPUs may execute machine-level instructions according to the exemplary operational flow described above in conjunction with FIG. 3. Moreover, embodiments of the present disclosure may be implemented on application specific integrated circuits (ASICs), FPGAs, digital signal processors (DSPs), or other specialized processing circuits. In fact, persons of ordinary skill in the art may utilize any number of suitable structures capable of executing logical operations according to the embodiments of the present disclosure.

Various embodiments include one or more advantages. For instance, some implementations provide a way to adapt a controlled vehicle to use a non-real time operating system by minimizing system delays, thereby approximating determinism.

Although selected embodiments have been illustrated and described in detail, it should be understood that a variety of substitutions and alterations are possible without departing from the spirit and scope of the present invention, as defined by the claims that follow.

What is claimed is:

1. A computer-implemented method for performing processing, the method comprising:
   setting a timer associated with a first processing event;
   scheduling an expected time for the processing event using wall clock time, wherein scheduling the expected time comprises:
   retrieving wall clock time data from an operating system kernel; and
   adding $N*1/F_{out}$ to the wall clock time to produce the expected time for performing the first processing event, where $F_{out}$ is the output frequency at which a sample output unit retrieves samples of control information from the memory device, and where N is an integer greater than zero;
   at the timer, using the expected time to calculate a delay associated with the timer;
   performing the first processing event in response to the timer; and
   setting a subsequent timer to compensate for the delay.

2. The method according to claim 1, in which the first processing event is associated with a first output sample, and further in which performing the first processing event includes sending the first output sample.

3. The method according to claim 2 in which the first output sample is sent to an on-board control module of a vehicle, and in which the first output sample comprises control data to physically control the vehicle.

4. The method according to claim 2, further comprising:
   retrieving the first output sample from a buffer that includes the first sample and subsequent samples.

5. The method according to claim 4 further comprising:
   receiving samples of control information; and
   storing the samples of control information to the buffer, wherein the output frequency is different than an input frequency used to receive the control information.

6. The method according to claim 4, wherein the buffer is protected by a semaphore.

7. The method according to claim 1, in which calculating the delay comprises:
   comparing a time at the timer to the expected time.

8. The method according to claim 1 in which setting a subsequent timer comprises:
   adding or subtracting time corresponding to the delay from $N*1/F_{out}$, where $F_{out}$ is an output frequency, and where N is an integer larger than zero.

9. A processor-based device comprising:
   a memory device that includes a plurality of output samples of control information;
   a sample output unit that sets a timer for retrieving the samples from the memory device, schedules an expected time for retrieving the samples from the memory device, at the timer using the expected time to calculate a delay associated with the timer, wherein scheduling the expected time comprises:
   retrieving wall clock time data from an operating system kernel associated with the sample output unit; and
   adding $N*1/F_{out}$ to the wall clock time to produce the expected time, where N is an integer greater than zero; and
   a device control unit receiving the samples retrieved from the memory device and using the samples to control a physical operation of the processor-based device, where $F_{out}$ is the selected frequency at which the device control unit receives samples of control information, and
   the sample output unit further setting a subsequent timer to compensate for the delay.

10. The processor-based device of claim 9 in which the memory device comprises a buffer shared by an input thread and an output thread, the shared buffer being protected by a semaphore.

11. The processor-based device of claim 9 in which the processor-based device comprises a teleoperated vehicle.

12. The processor-based device of claim 9 further comprising:
- a transceiver unit receiving the control information and providing the samples of the control information to the memory device.

13. The processor-based device of claim 9 in which the timers comprise software timers having delay characteristics.

14. A computer program product having a non-transitory computer readable medium tangibly recording computer program logic, the computer program product comprising:
- code to set a timer associated with a first processing event;
- code to schedule an expected time for the processing event using wall clock time, wherein the code to schedule an expected time comprises:
  - instructions to retrieve wall clock time data from an operating system kernel; and
  - instructions to add $N*1/F_{out}$ to the wall clock time to produce the expected time for performing the first processing event, where $F_{out}$ is the output frequency at which a sample output unit retrieves the samples of control information from the memory device, and where N is an integer greater than zero;
- code to, at the timer, use the expected time to calculate a delay associated with the timer;
- code to perform the first processing event in response to the timer; and
- code to set a subsequent timer to compensate for the delay.

15. The computer program product according to claim 14 in which the first processing event is associated with a first output sample, in which the code to perform the first processing event includes instructions to send the first output sample.

16. The computer program product according to claim 15 in which the first output sample is sent to an on-board control module of a vehicle, and in which the first output sample comprises control data to physically control the vehicle.

17. The computer program product according to claim 15, further comprising:
- code to retrieve the first output sample from a buffer that includes the first sample and subsequent samples.

18. The computer program product according to claim 14 in which the code to set a subsequent timer comprises:
- instructions to add or subtract time corresponding to the delay from $N*1/F_{out}$, where $F_{out}$ is an output frequency, and where N is an integer larger than zero.

19. The computer program product according to claim 17 further comprising:
- code to receive samples of control information; and
- code to store the samples of control information to the buffer,
- wherein the output frequency is different than an input frequency used to receive the control information.

20. The computer program product according to claim 17, wherein the buffer is protected by a semaphore.

* * * * *